United States Patent
Baldischweiler

(10) Patent No.: US 12,282,815 B2
(45) Date of Patent: Apr. 22, 2025

(54) METHOD FOR PRODUCING A MULTI-LAYERED CARD BODY

(71) Applicant: GIESECKE+DEVRIENT MOBILE SECURITY GMBH, Munich (DE)

(72) Inventor: Michael Baldischweiler, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/036,776

(22) PCT Filed: Nov. 17, 2021

(86) PCT No.: PCT/EP2021/025448
§ 371 (c)(1),
(2) Date: May 12, 2023

(87) PCT Pub. No.: WO2022/106060
PCT Pub. Date: May 27, 2022

(65) Prior Publication Data
US 2023/0409862 A1 Dec. 21, 2023

(30) Foreign Application Priority Data
Nov. 19, 2020 (DE) .................. 10 2020 007 084.1

(51) Int. Cl.
*G06K 19/077* (2006.01)
*G06K 19/07* (2006.01)

(52) U.S. Cl.
CPC ... *G06K 19/07722* (2013.01); *G06K 19/0723* (2013.01); *G06K 19/07747* (2013.01); *G06K 19/07779* (2013.01)

(58) Field of Classification Search
CPC ......... G06K 19/07722; G06K 19/0723; G06K 19/07747; G06K 19/07779; G06K 19/02; G06K 19/07769; G06K 19/07771
See application file for complete search history.

(56) References Cited

U.S. PATENT DOCUMENTS

| | | | |
|---|---|---|---|
| 11,983,592 B2 * | 5/2024 | Baldischweiler | G06K 19/07781 |
| 11,993,065 B2 * | 5/2024 | Nam | G06K 19/02 |
| 2016/0110639 A1 | 4/2016 | Finn et al. | |

(Continued)

FOREIGN PATENT DOCUMENTS

WO 2019079007 A1 4/2019

OTHER PUBLICATIONS

German Search Report for corresponding DE Patent Application No. DE102020007084.1, May 27, 2021.

(Continued)

*Primary Examiner* — Sonji N Johnson
(74) *Attorney, Agent, or Firm* — Workman Nydegger

(57) ABSTRACT

In a method for manufacturing a multi-layered card body with a metallic core layer and at least one cover layer for a contactless or dual-interface chip card an adhesive is applied to at least one side of the metallic core layer in such a manner that a slot in the metallic core layer is filled with the adhesive. The metallic core layer is subsequently laminated with the cover layer by means of the adhesive. As a result, no short-circuit can occur in the slot, e.g. by metal chips remaining in the slot, because the slot has already been filled with the adhesive.

12 Claims, 6 Drawing Sheets

(56) References Cited

U.S. PATENT DOCUMENTS

| | | | |
|---|---|---|---|
| 2018/0339503 A1 | 11/2018 | Finn et al. | |
| 2019/0311236 A1* | 10/2019 | Sexl | G06K 19/07771 |
| 2020/0257953 A1 | 8/2020 | Lotya et al. | |
| 2021/0073608 A1* | 3/2021 | Finn | B21D 5/16 |
| 2021/0081743 A1* | 3/2021 | Finn | G06K 19/07716 |

OTHER PUBLICATIONS

International Search Report for corresponding PCT Application No. PCT/EP2021/025448, Feb. 24, 2022.

* cited by examiner

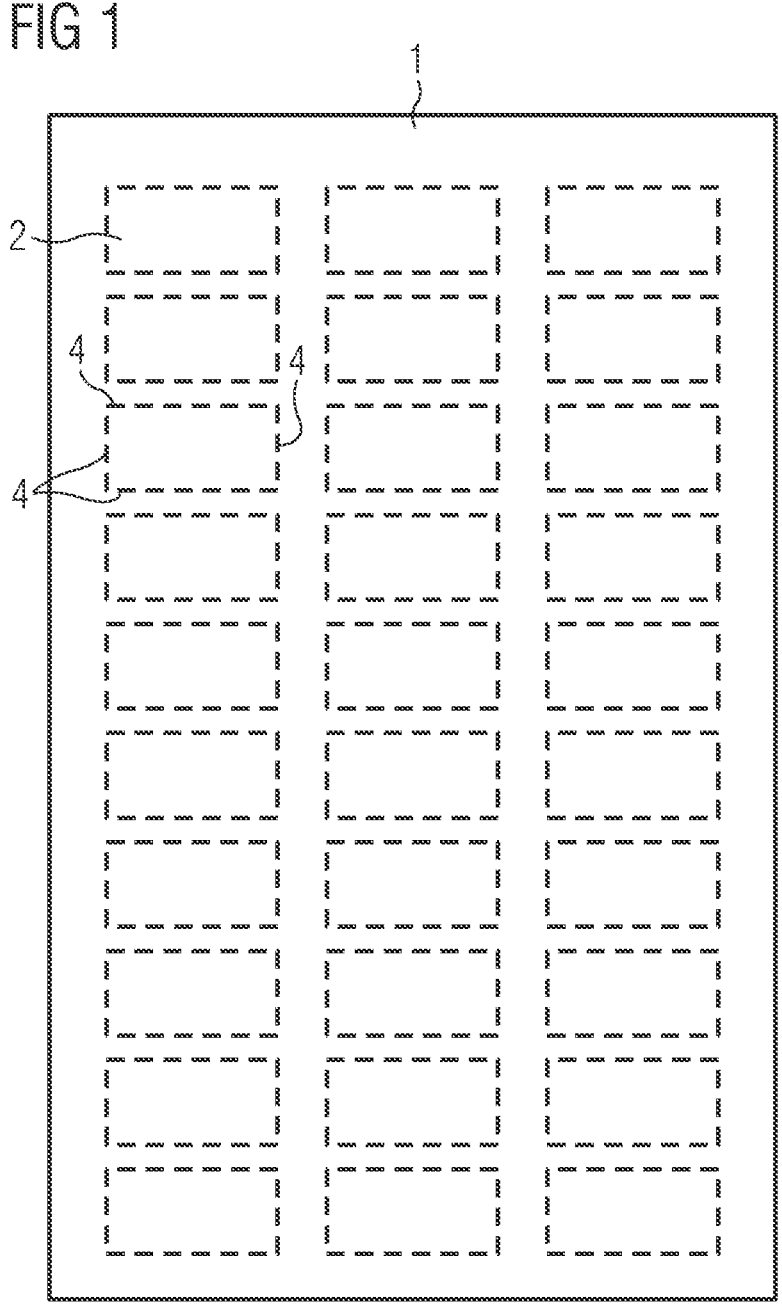

METHOD FOR PRODUCING A MULTI-LAYERED CARD BODY

BACKGROUND

The present invention relates to a method for manufacturing a multi-layered card body with a metallic core layer for a contactless or dual-interface chip card and to a method for manufacturing the chip card.

A contactless or dual-interface chip card comprises a card body, a chip and an antenna coil coupled to the chip. The antenna coil is located either in a chip module, which comprises the chip, or in the card body. A conventional card body is manufactured of thermoplastic material such as, for example, PVC, PET, PETG or ABS, but which is sometimes susceptible to cracks and fractures. For example, the chip card can break due to torsion in a trouser pocket.

Compared to conventional card bodies, a card body with a metallic core layer has a longer service life due to its relatively greater resistance to torsion. Furthermore, the metallic chip card has a high-quality and robust feel in view of its weight. However, by integrating the metallic core layer into the card body, the contactless function of the chip card is substantially damped, so that the switching distance between the chip card and a card reader decreases. This is due to the fact that the metal material of the metallic core layer generally shields electromagnetic waves. This is because the energy transmitted by the card reader to the chip card by means of the electromagnetic waves is partly absorbed and reflected by the metallic core layer. In particular, when the chip card is located in an alternating magnetic field of the card reader, the electrons of the metallic core layer move around the chip module along a flow direction, so that an eddy current is created by the movement of the electrons. On the one hand, the transmitted energy is lost as heat due to the resulting eddy current, which is referred to as "absorbing", and on the other hand, an intrinsic magnetic field is generated, which counteracts a change in the alternating magnetic field of the card reader generated by the intrinsic magnetic field, which is also referred to as "reflecting". Since the transmitted energy is lost more or less through the eddy current, this has the result that the remaining energy which can actually be utilized by the chip module for contactless communication is correspondingly smaller than the originally transmitted energy, i.e. the switching distance has to be reduced due to the eddy current.

Various manufacturing methods are known to counteract the damping influence of the metallic core layer. US 20160110639 A1 discloses a chip card which comprises on the one hand a chip module with a chip and a module antenna and on the other hand a metallic card body core layer with a cavity for accommodating the chip module and a slot. The slot, which is laser cut or chemically etched, for example, overlaps the module antenna of the chip module and extends from the chip module to an outer edge of the metallic card body core layer. To a certain extent, the slot serves to attenuate the damping influence mentioned above and to increase the reduced switching distance by interrupting the flow of electrons in the metallic card body core layer. Since the originally closed eddy current circuit around the chip module is disrupted due to the slot and no eddy current can occur in the vicinity of the chip module, the energy available for the functionality of the chip module is correspondingly heightened again. On the one hand, the slot should be as wide as possible to effectively prevent the eddy current, and on the other hand, it should be as narrow as possible in view of the mechanical stability of the chip card.

SUMMARY

A method for manufacturing multi-layered card bodies with metallic core layers for contactless or dual-interface chip cards is currently carried out as follows, for example. First, one or several PVC or PC foils for a multiplicity of cover layers and a metallic multi-up sheet for a corresponding multiplicity of metallic core layers are made available. A multiplicity of slots is produced in the metallic multi-up sheet in such a manner that each metallic core layer of the metallic multi-up sheet comprises a slot. An adhesive is then applied to one side of the foil and the foil is laminated with the metallic multi-up sheet under pressure and/or temperature by means of the adhesive. The individual laminated metallic core layers are subsequently separated from the laminated metallic multi-up sheet. Finally, a cavity for accommodating a chip module is produced in the laminated metallic core layer that has been separated, and a chip module is later fixed in the cavity by means of an adhesive.

When producing the cavity, metal chips can accumulate in the slot. In addition, the slot can shift so strongly both during lamination and during fixing of the chip module that two spaced-apart inner walls of the slot can come into contact with each other. Thus it can occur, due to high pressures and remaining metal chips in the continuous opening of the slot, that an initially clean and narrow slot is compressed by distortion and that through the compression an undesired partial or even complete closure is formed in the slot.

This object is achieved by a method for manufacturing a multi-layered card body with a metallic core layer and a corresponding method for manufacturing a contactless or dual-interface chip card and by a corresponding card body and a corresponding chip card having the features of the independent claims. Embodiments and development are stated in the dependent claims.

A first aspect of the above disclosure relates to a method for manufacturing a multi-layered card body with a metallic core layer. According to this first aspect, the method starts with making available a metallic core layer with at least one slot and making available at least one cover layer, which can be, for example, a transparent cover layer and/or a layer with a pre-printed pattern and/or a spacer layer and/or any other layer. In particular, it can have security features. Thereafter, an adhesive, such as, for example, a Lobra adhesive, is applied, e.g. by brushing, spraying or application by doctor blade, such that the at least one slot of the metallic core layer is filled with the adhesive. Filling the slot with the adhesive, which later dries or cures, prevents the formation of a short-circuit in the slot during subsequent method steps. The at least one cover layer is subsequently laminated with the metallic core layer under pressure and/or temperature by means of the adhesive applied to the metallic core layer.

A basic idea of the present disclosure consists in applying the adhesive not to one side of the at least one cover layer, but to the at least one side of the metallic core layer. On the one hand, the adhesive serves as a normal bonding aid, by means of which the metallic core layer is laminated with the at least one cover layer. On the other hand, the adhesive also serves as an electrically non-conductive insulator in the slot. After the adhesive has dried or cured, metal chips can no longer settle in the slot and mechanical shifts cannot lead to a short circuit in the slot.

In addition, it is of particular advantage that the adhesive can be applied to the side of the metallic core layer and into the at least one slot in one working step. This keeps the manufacturing time short. Thus, the possibility of a short circuit in the slot can be completely eliminated without the need for additional manufacturing means or additional manufacturing steps.

After the lamination step, a cavity can be produced e.g. by lasering, milling or punching in the at least one cover layer and the metallic core layer for accommodating a chip module. It is important that the depth of the cavity reaches the metallic core layer and the cavity is adjacent to the at least one slot.

In order to make available the metallic core layer with the at least one slot, a metallic multi-up sheet for a multiplicity of metallic core layers can first be made available. Subsequently, the multiplicity of metallic core layers can be separated from the metallic multi-up sheet e.g. by lasering, milling or punching. Ultimately, the at least one slot can be produced in a metallic core layer that has been separated from the metallic multi-up sheet.

Alternatively, a multiplicity of slots can first be produced in the metallic multi-up sheet made available in such a manner that each metallic core layer of the multiplicity of metallic core layers of the metallic multi-up sheet comprises at least one slot. Thereafter, the multiplicity of metallic core layers with the corresponding multiplicity of slots can be separated from the metallic multi-up sheet. Preferably, the step of separating the multiplicity of metallic core layers from the metallic multi-up sheet and the step of producing the multiplicity of slots in the metallic multi-up sheet can be performed in one working step, e.g. can be simultaneously punched out in a punching process or milled out in a milling process or lasered in a lasering process, to reduce the manufacturing time and increase the effectiveness of the method.

Width, length, shape, depth and direction of the slot and the angular position between the slot and an edge of the metallic core layer or the angular position between the slot and a cutting line along which the multiplicity of metallic core layers is separated from the metallic multi-up sheet, as well as the number of slots in the metallic core layer can be changed as required. In addition to the aforementioned manner, the at least one slot can also be chemically etched. In order to maximize the effectiveness of the at least one slot of the metallic core layer, the slot extends to an edge of the metallic core layer or to at least one of the cutting lines of the metallic multi-up sheet. In particular, the slot can be produced with a width of 50 µm in order to achieve an optimal compromise between the effective prevention of eddy currents in the vicinity of the cavity and the stability of the card body.

A second aspect of the preceding disclosure relates to a method for manufacturing a contactless or dual-interface chip card with the card body manufactured according to the first aspect of the disclosure. According to this second aspect, the method begins with making available a chip module, which is fixed in the cavity of the card body e.g. by means of an adhesive. The chip module comprises an inductively coupling antenna coil, preferably with at least one winding, and a chip, preferably an RFID or an NFC chip.

A third aspect of the preceding disclosure relates to the multi-layered card body as such, which comprises at least one cover layer and a metallic core layer with at least one slot, wherein the slot is filled with an adhesive and the metallic core layer is connected, e.g. laminated, to the at least one cover layer by means of the adhesive.

Finally, a fourth aspect of the disclosure relates to a contactless or dual-interface chip card with the multi-layered card body according to the third aspect of the preceding disclosure and a chip module, wherein, in the cover layer and the metallic core layer, there is a cavity present which is adjacent to the at least one slot of the metallic core layer and in which the chip module is inserted. The at least one slot of the metallic core layer is filled with an adhesive, wherein the metallic core layer is also connected, e.g. laminated, with the at least one cover layer by means of the adhesive.

BRIEF DESCRIPTION OF THE DRAWINGS

The present invention will hereinafter be described by way of example with reference to the attached drawings, wherein the representations are purely schematic. Therein are shown:

FIG. 1 a plan view of a metallic multi-up sheet 1 for a multiplicity of metallic core layers 2;

DETAILED DESCRIPTION OF VARIOUS EMBODIMENTS

FIG. 1 shows the plan view of a metallic multi-up sheet 1 for a multiplicity of metallic core layers 2 of equal size. The metallic multi-up sheet 1 has a multiplicity of cutting lines 4 along which the metallic core layers 2 can be separated from the metallic multi-up sheet 1 in a further step. The cutting lines 4 can be visible and/or virtual lines. The thickness of the metallic multi-up sheet 1 should be smaller than the maximum thickness of a chip card body according to ISO 7810. Deviating from FIG. 1, the total number of metallic core layers 2 and/or the number of metallic core layers 2 per row and column of the metallic multi-up sheet 1 can be changed as required.

Figure 2A:
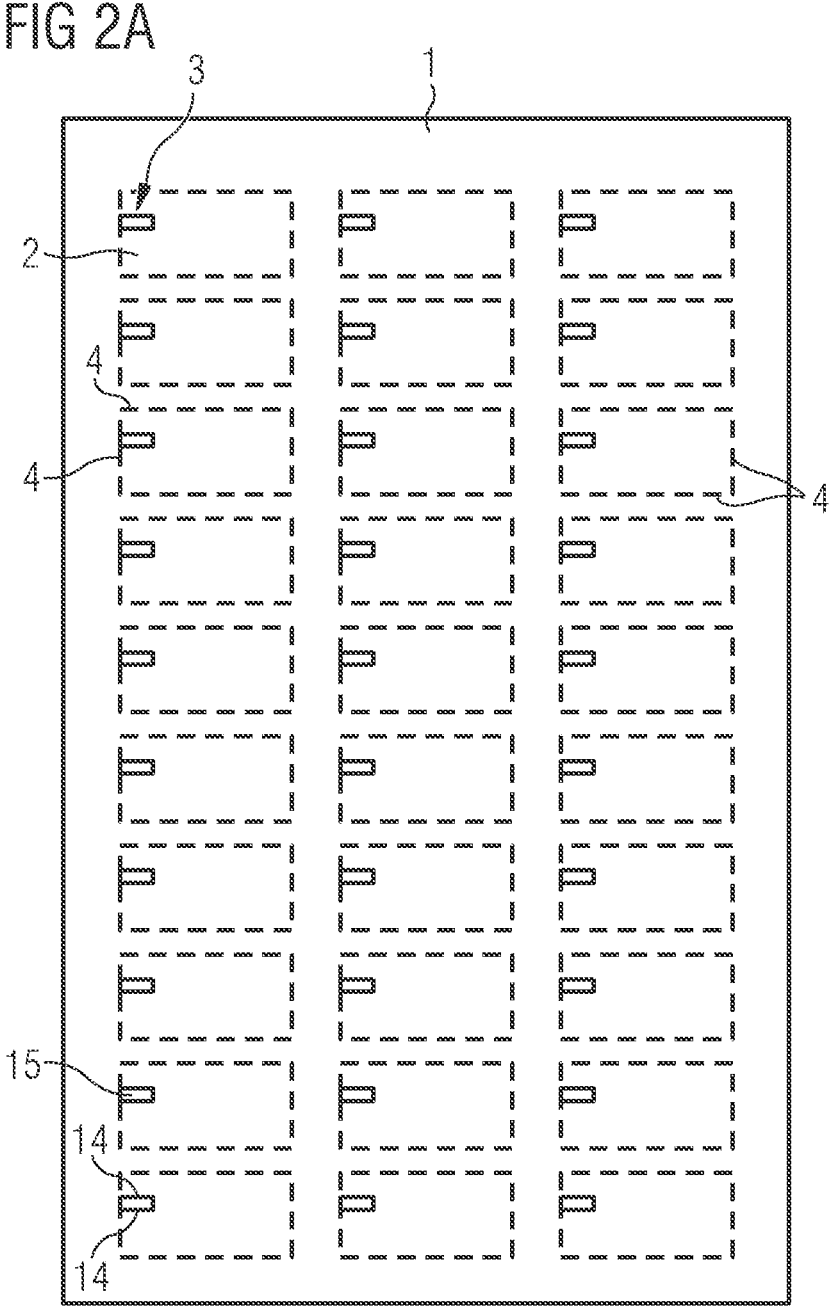
FIG. 2A a plan view of the metallic multi-up sheet 1 according to FIG. 1, wherein each metallic core layer 2 has a slot 3.
Figure 2B:
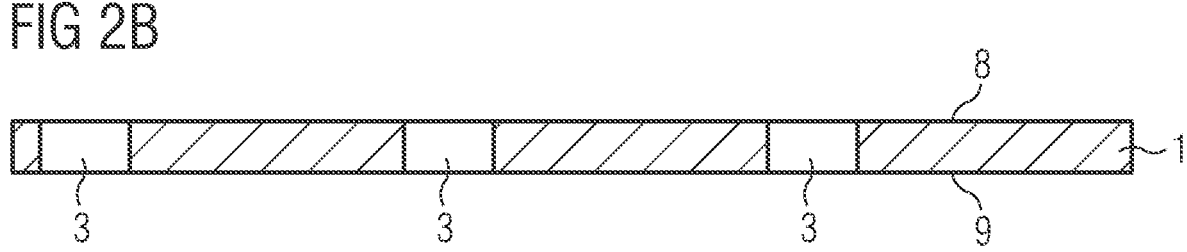
FIG. 2B a cross-sectional view of the metallic multi-up sheet 1 according to FIG. 2A.

FIG. 2A shows the plan view of the metallic multi-up sheet 1 according to FIG. 1, wherein each of the metallic core layers 2 of the multi-up sheet 1 has a slot 3. The slot 3 extends up to a cutting line 4 of the metallic multi-up sheet 1 and has a continuous opening 15 in particular over its entire length, in which the two inner walls 14 of the slot 3 do not make contact. Deviating from FIG. 2, the length, depth, width, shape, direction of the slot 3 and the angular position between the slot 3 and the cutting line 4 as well as the number of slots 3 per metallic core layer 2 can be changed as required. FIG. 2B shows the metallic multi-up sheet 1 according to FIG. 2A with the slots 3 provided therein in cross section.

Figure 3:
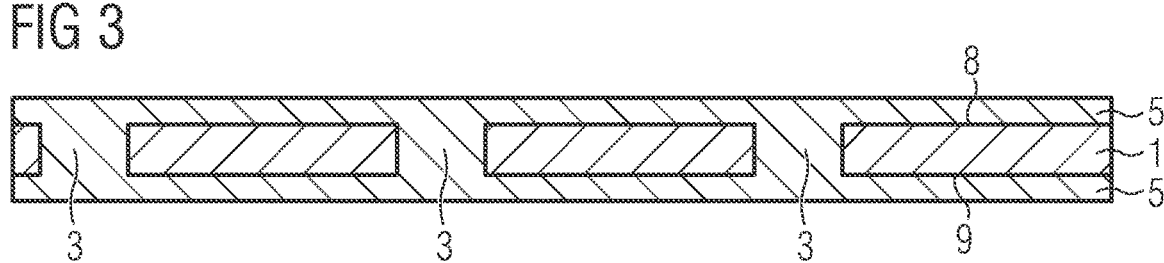
FIG. 3 a cross-sectional view of the metallic multi-up sheet 1 according to FIGS. 2A and 2B, on the front side 8 and back side 9 of which an adhesive 5 has been applied.

FIG. 3 shows the cross-sectional view of the metallic multi-up sheet 1 according to FIGS. 2A and 2B. An adhesive 5 is applied, e.g. by brushing, spraying or application by doctor blade, to the front side 8 and back side 9 of the metallic multi-up sheet 1, so that the slots 3 fill with the adhesive 5. The filling of the slots 3 with the adhesive 5, which later dries or cures, prevents the formation of a short-circuit in the slots 3 during subsequent method steps.

Figure 4:
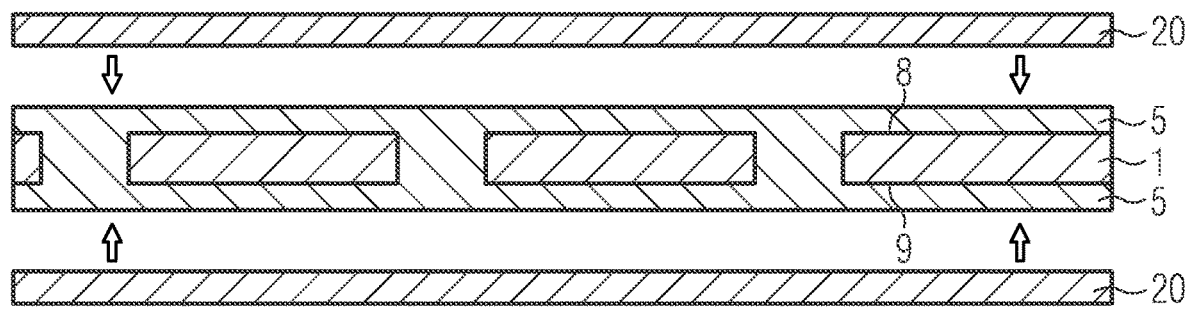
FIG. 4 a cross-sectional view of the metallic multi-up sheet 1 according to FIG. 3 and a multi-up sheet 20 of plastic made available on the front side 8 and on the back side 9.

FIG. 4 shows the cross-sectional view of the metallic multi-up sheet 1 according to FIG. 3 and a multi-up sheet 20 made of plastic to be applied respectively to the front side 8 and to the back side 9 of the metallic multi-up sheet 1. PVC and PC in particular come into consideration as plastic materials. The plastic multi-up sheet 20 can be, for example, a transparent multi-up sheet and/or a multi-up sheet with a printed pattern and/or any other multi-up sheet. In addition, the multi-up sheet 20 can be of the same size as or slightly larger than the metallic multi-up sheet 1 according to FIGS. 1 to 3.

Figure 5:
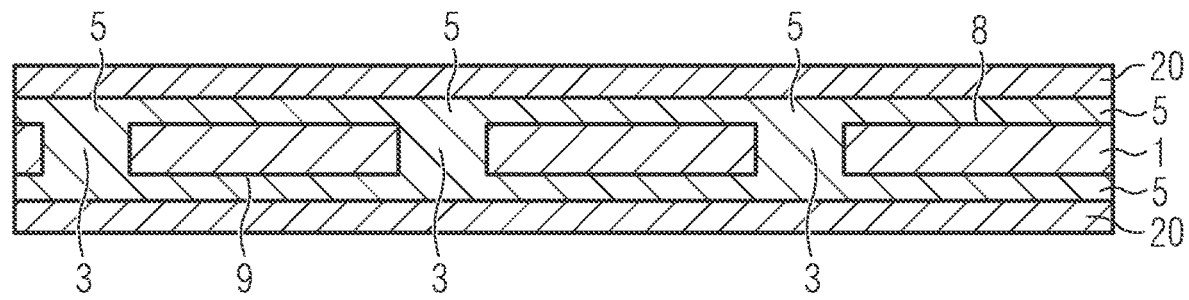
FIG. 5 a cross-sectional view of the metallic multi-up sheet 1 and the two plastic multi-up sheets 20 according to FIG. 4, which are laminated to one another by means of the adhesive 5.

FIG. 5 shows the cross-sectional view of the metallic multi-up sheet 1 and of the two plastic multi-up sheets 20 according to FIG. 4, wherein the metallic multi-up sheet 1 has been laminated with the plastic multi-up sheets 20 under pressure and/or temperature by means of the adhesive 5 already applied to its two sides 8 and 9. Since the slots 3 are filled with the adhesive 5, mechanical shifts during lamination, which could lead to a short circuit in the slots 3, are largely ruled out.

Deviating from FIGS. 3 and 5, first the adhesive 5 and later the plastic multi-up sheet 20 can be applied only to the front side 8 of the metallic multi-up sheet 1. Alternatively, more than one plastic multi-up sheet 20 can be applied to the front side 8 and/or the back side 9 of the metallic multi-up sheet 1 as required.

Figure 6:
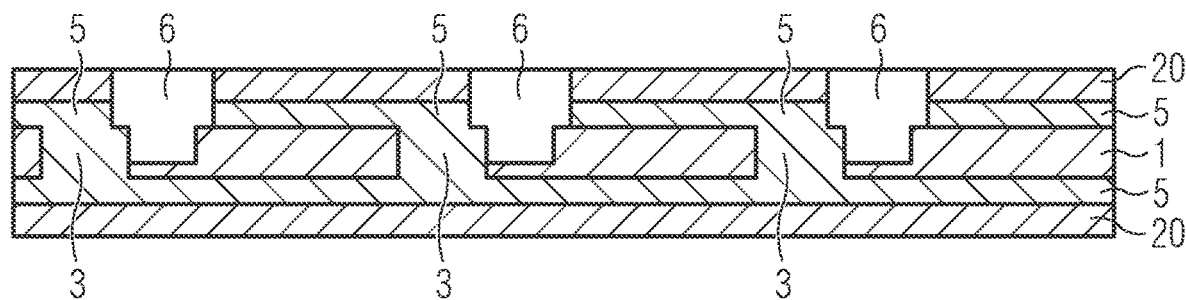
FIG. 6 a cross-sectional view of the laminated multi-up sheet according to FIG. 5 with cavities 6 for accommodating chip modules.

FIG. 6 shows the cross-sectional view of the laminated multi-up sheet according to FIG. 5. A corresponding number of cavities 6 for accommodating chip modules are produced, e.g. by punching, milling or lasering, so that each cavity 6 is adjacent to the corresponding slot 3 and the depth of the cavity 6 reaches at least the metallic multi-up sheet 1. When producing the cavities 6 no metal chips can accumulate in the slots 3, since the slots 3 have already been filled with the adhesive 5 in the previous method steps.

Figure 7:
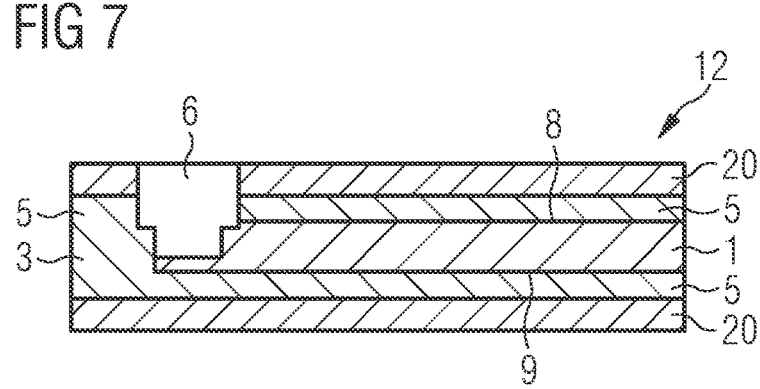
FIG. 7 a cross-sectional view of an insulated card body 12.

FIG. 7 shows the cross-sectional view of a card body 12 separated from the laminated multi-up sheet according to FIG. 6, e.g. by punching milling out or lasering.

Alternatively, the card body 12 can first be separated from the laminated multi-up sheet according to FIG. 5, e.g. by punching, milling or lasering (cf. FIG. 13) and the cavity 6 can be produced in the individual card body 12 only afterwards.

Figure 8:
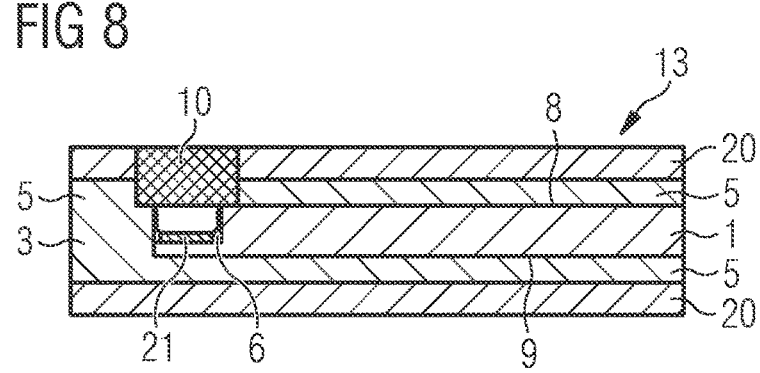
FIG. 8 the card body 12 according to FIG. 7 and a chip module 10 inserted in the cavity 6 of the card body 12.

FIG. 8 shows the cross-sectional view of a chip card 13 with the card body 12 according to FIG. 7. A chip module 10 is inserted in the cavity 6 of the card body 12 by means of an adhesive 21. The chip module 10 includes an inductively coupling antenna coil, preferably with at least one winding, and a chip, preferably an RFID or NFC chip.

Figure 9:
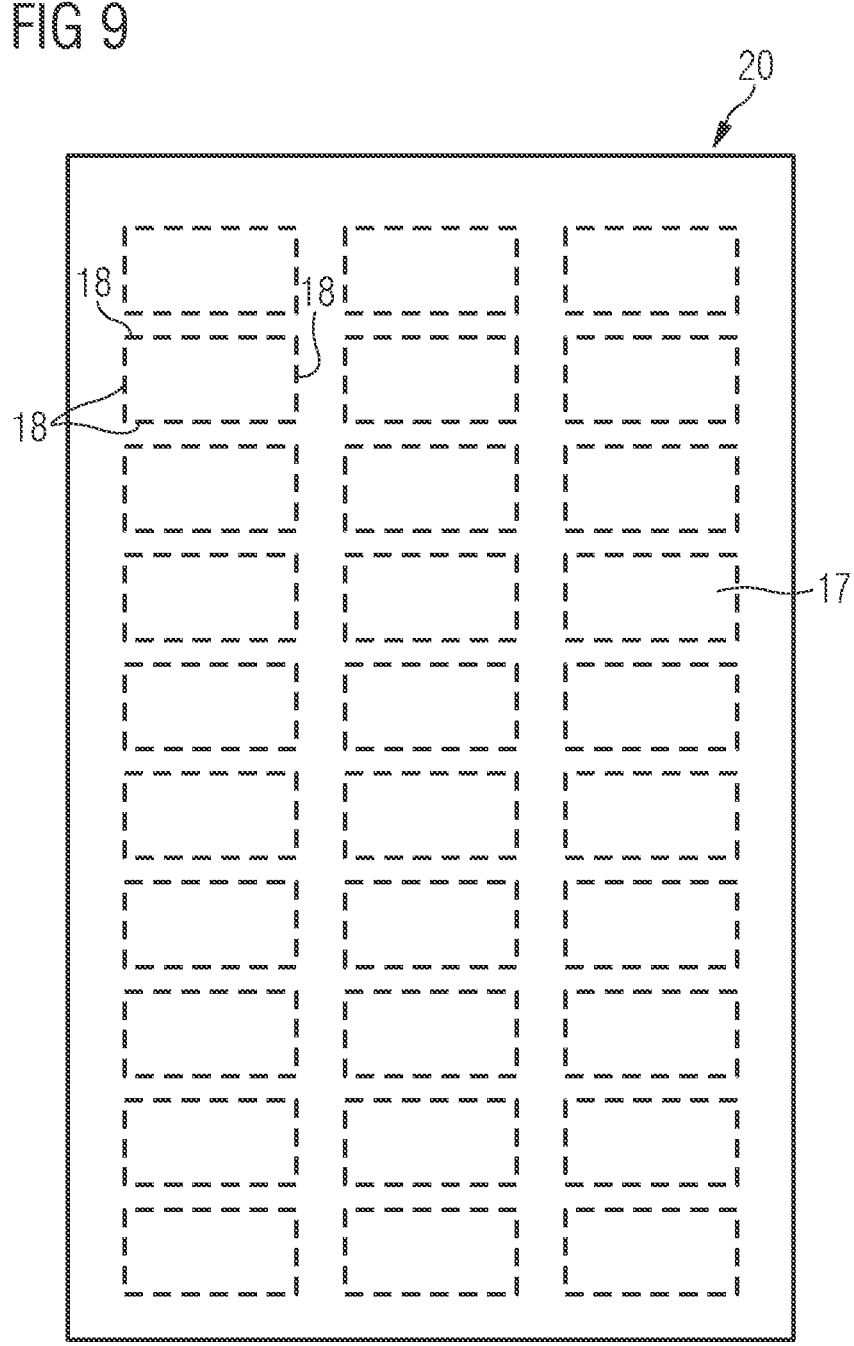
FIG. 9 a plan view of the plastic multi-up sheet 20 according to FIGS. 4 to 6 for the manufacture of a multiplicity of cover layers 17.

The following FIGS. 9 to 14 show a second variant for manufacturing the card body 12. FIG. 9 shows the plan view of a plastic multi-up sheet 20, which can correspond to the plastic multi-up sheet 20 from FIGS. 4 to 6, for the manufacture of a multiplicity of cover layers 17 of equal size. The cover layers 17 of the plastic multi-up sheet 20 should be of the same size as the metallic core layers 2 of the metallic multi-up sheet 1. A multiplicity of cutting lines 18 of the plastic multi-up sheet 20, along which the cover layers 17 are separated from the plastic multi-up sheet 20, can likewise be formed by visible and/or virtual lines, like the cutting lines 4 of the metallic multi-up sheet 1 according to FIGS. 1 and 2A.

Figure 10:
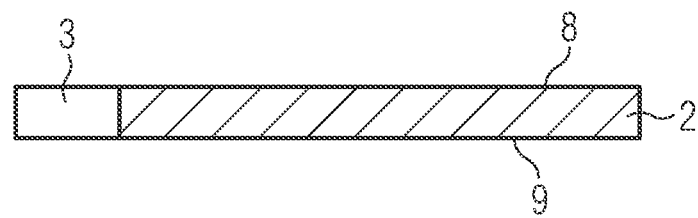
FIG. 10 a cross-sectional view of an insulated metallic core layer 2 with a slot 3.

FIG. 10 shows the cross-sectional view of a metallic core layer 2 with a slot 3 separated from the metallic multi-up sheet 1 according to FIGS. 2A and 2B.

Alternatively, FIG. 10 shows the cross-sectional view of a metallic core layer 2 separated from the metallic multi-up sheet 1 according to FIG. 1, in which the slot 3 is produced only afterwards. Alternatively, the slot 3 can be produced at the same time as the multiplicity of metallic core layers 2 are separated from the multi-up sheet 1 according to FIG. 1.

Figure 11:
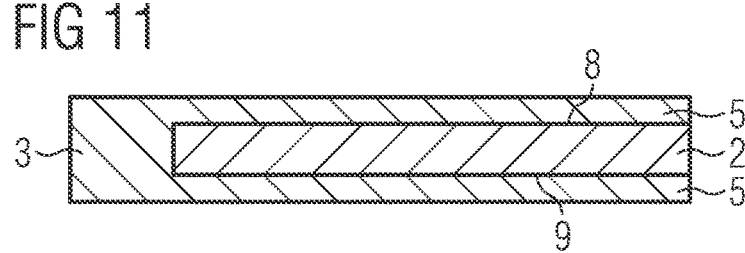
FIG. 11 a cross-sectional view of the metallic core layer 2 according to FIG. 10, on the front side 8 and back side 9 of which an adhesive 5 has been applied.

FIG. 11 shows the cross-sectional view of the metallic core layer 2 according to FIG. 10. An adhesive 5 is applied, e.g. by brushing, spraying or application by doctor knife, to the front side 8 and the back side 9 of the metallic core layer 2, so that the slot 3 of the metallic core layer 2 is filled with the adhesive 5.

Before the adhesive 5 is applied to the metallic core layer 2, a test can be carried out with reference to the opening 15 of the slot 3. The test determines whether the slot 3 is clean and/or there is no short circuit present. A metallic core layer 2 that fails the test is thus filtered out at the beginning of the manufacturing method. As a result of the preventive filtering out of all metallic core layers 2 with the defective slots 3, only the functional metallic core layers 2 are then fed to the further method steps.

Figure 12:
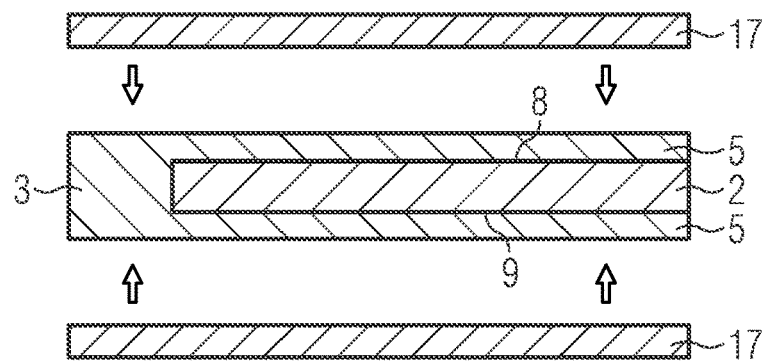
FIG. 12 a cross-sectional view of the metallic core layer 2 according to FIG. 11 and two cover layers 17.

FIG. 12 shows the cross-sectional view of the metallic core layer 2 according to FIG. 11 supplied with the adhesive 5 and of two cover layers 17 separated from the multi-up sheet 20 according to FIG. 9, e.g. by punching, milling or lasering. A cover layer 17 is laminated respectively onto the front side 8 and the back side 9 of the metallic core layer 2.

Figure 13:
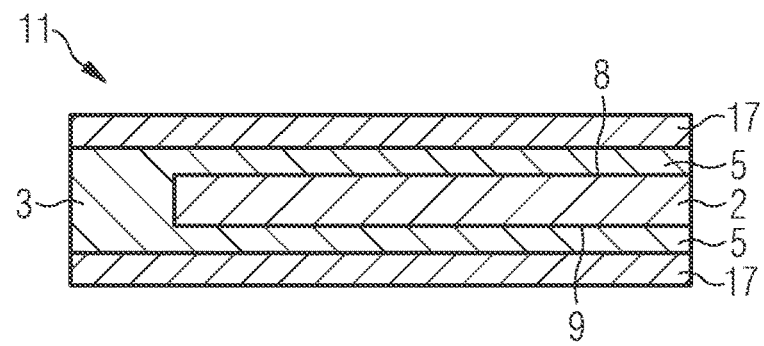
FIG. 13 a cross-sectional view of a card body 11 with the metallic core layer 2 and the cover layers 17 according to FIG. 12, which are laminated to one another by means of the adhesive 5.

FIG. 13 shows the cross-sectional view of a card body 11 with the metallic core layer 2 and the cover layers 17 according to FIG. 12, wherein the metallic core layer 2 has been laminated with the cover layers 17 under pressure and/or temperature by means of the adhesive 5 already applied to its two sides 8 and 9. During lamination it is unlikely that mechanical shifts could lead to a short circuit in the slot 3 because it was filled with the adhesive 5 in the previous method steps.

Deviating from FIGS. 11 and 12, first the adhesive 5 and later the cover layer 17 can be applied only to the front side 8 of the metallic core layer 2. Alternatively, more than one cover layer 17 can be applied to the front side 8 and/or the back side 9 of the metallic core layer 2.

Figure 14:
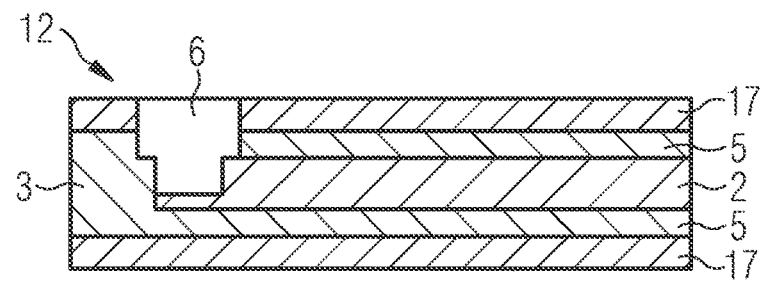
FIG. 14 a cross-sectional view of the card body 11 according to FIG. 13 with a cavity 6 for accommodating a chip module.

FIG. 14 shows the cross-sectional view of the card body 12 with the card body 11 according to FIG. 13, in which a cavity 6 for accommodating a chip module was produced. When producing the cavity 6, no metal chips can accumulate in the slot 3, since the slot 3 was already filled with the adhesive 5 in the previous method steps, which has meanwhile dried and is correspondingly hard.

The invention claimed is:

1. A method for manufacturing a multi-layered card body with a metallic core layer for a contactless or a dual-interface chip card, comprising the steps of:
    making available a metallic core layer with at least one slot and making available at least one cover layer;
    carrying out a test to determine whether the slot is clean and/or whether there is no short circuit present in the slot; and
    depending on whether the slot is clean and/or there is no short circuit present in the slot:
        applying an adhesive to at least one side of the metallic core layer and simultaneously filling in the at least one slot with the adhesive; and then
        laminating the at least one cover layer with the metallic core layer by means of the adhesive.

2. The method according to claim 1, comprising the following step of:
    producing a cavity in the at least one cover layer and the metallic core layer for accommodating a chip module in such a manner that the cavity is adjacent to the at least one slot.

3. The method according to claim 2, comprising the following step of:
    making available and fixing a chip module in the cavity.

4. The method according to claim 2, wherein the chip module has an inductively coupling antenna coil and a chip.

5. The method according to claim 1, wherein the step of making available the metallic core layer comprises the following substeps of:
    making available a metallic multi-up sheet for a multiplicity of metallic core layers;
    separating the multiplicity of metallic core layers from the metallic multi-up sheet; and
    producing at least one slot in a metallic core layer separated from the metallic multi-up sheet.

6. The method according to claim 1, wherein filling in the at least one slot with adhesive comprises filling in an entirety of the at least one slot with adhesive.

7. A method for manufacturing a multi-layered card body with a metallic core layer for a contactless or a dual-interface chip card, comprising the steps of:
    making available a metallic core layer with at least one slot and making available at least one cover layer;
    applying an adhesive to at least one side of the metallic core layer in such a manner that the at least one slot is filled with the adhesive; and
    laminating the at least one cover layer with the metallic core layer by means of the adhesive;
    wherein the step of making available the metallic core layer comprises the following substeps of:
    making available a metallic multi-up sheet for a multiplicity of metallic core layers;
    producing a multiplicity of slots in the metallic multi-up sheet such that each metallic core layer of the multiplicity of metallic core layers of the metallic multi-up sheet comprises at least one slot; and later or simultaneously with the production of the slots,
    separating the multiplicity of metallic core layers from the metallic multi-up sheet.

8. The method according to claim 7, wherein the step of applying the adhesive and the step of laminating take place prior to the step of separating the multiplicity of metallic core layers from the metallic multi-up sheet.

9. The method according to claim 8, wherein the method further comprises producing a cavity in the at least one cover layer and the metallic core layer for accommodating a chip module in such a manner that the cavity is adjacent to the at least one slot, and the step of producing the cavity takes place prior to the step of separating the multiplicity of metallic core layers from the metallic multi-up sheet.

10. A metallic multi-up sheet having a multiplicity of metallic core layers,
    wherein the metallic multi-up sheet comprises a multiplicity of slots such that each metallic core layer of the multiplicity of metallic core layers of the metallic multi-up sheet comprises at least one slot;
    wherein an adhesive is applied to at least one side of each of the metallic core layers in such a manner that the at least one slot of each of the metallic core layers is filled with the adhesive;
    wherein each metallic core layer comprises at least one cover layer and each of the at least one cover layers is laminated with its respective metallic core layer by means of the adhesive; and
    wherein the multiplicity of metallic core layers is configured to be separated from the metallic multi-up sheet later or simultaneously with a production of the slots.

11. The metallic multi-up sheet according to claim 10, wherein each slot is entirely filled with adhesive.

12. The metallic multi-up sheet according to claim 10, wherein in each metallic core layer of the multiplicity of metallic core layers of the metallic multi-up sheet there is a cavity for accommodating a chip module in such a manner that the cavity is adjacent to the at least one slot.

* * * * *